United States Patent [19]
Eberhart

[11] Patent Number: 5,797,309
[45] Date of Patent: Aug. 25, 1998

[54] STEERING VALVE

[75] Inventor: Eugen Eberhart, Dusseldorf, Germany

[73] Assignee: TRW Fahrwerksysteme GmbH & Co. KG, Dusseldorf, Germany

[21] Appl. No.: 401,349

[22] Filed: Mar. 9, 1995

[51] Int. Cl.$^6$ ........................................... F15B 5/10
[52] U.S. Cl. ............... 91/375 A; 91/375 R; 92/130 B
[58] Field of Search ..................... 91/370, 371, 372, 91/375 R, 375 A, 386, 387, 389; 60/393; 92/130 B, 135

[56] References Cited

U.S. PATENT DOCUMENTS

| | | | |
|---|---|---|---|
| 4,387,627 | 6/1983 | Avezou | 92/222 |
| 4,774,847 | 10/1988 | Breitweg | 91/375 A X |
| 4,793,433 | 12/1988 | Emori et al. | 91/375 A X |
| 4,819,545 | 4/1989 | Dymond | 91/371 |
| 5,046,574 | 9/1991 | Goodrich, Jr. et al. | 91/375 A X |
| 5,052,278 | 10/1991 | Smillie, III et al. | 92/159 |
| 5,070,958 | 12/1991 | Goodrich, Jr. et al. | 180/143 |
| 5,230,273 | 7/1993 | Fraley, Jr. | 91/375 A X |
| 5,293,954 | 3/1994 | Dymond | 91/371 X |
| 5,339,917 | 8/1994 | Eberhart | 91/375 A X |
| 5,478,059 | 12/1995 | Toyoshi et al. | 91/375 A X |

FOREIGN PATENT DOCUMENTS

| | | | |
|---|---|---|---|
| 0244449 | 11/1987 | European Pat. Off. | |
| 0327450 | 8/1989 | European Pat. Off. | |
| 3634215 | 4/1987 | Germany | |
| 3934468 | 4/1990 | Germany | |
| 8702318 | 4/1987 | WIPO | |
| 94/158257 | 7/1994 | WIPO | 91/375 A |

*Primary Examiner*—Hoang Nguyen
*Attorney, Agent, or Firm*—Tarolli, Sundehim, Covell Tummino & Szabo

[57] ABSTRACT

In order to economize the manufacture and assembly as well as reduce the expenditure of components and functionally improve a steering valve for supplying an actuator with hydraulic pressure, comprising an input shaft 2, an output shaft 3, a torsion rod 4 that is connected to one end to the input shaft 2 and with the other end to the output shaft 3, a valve sleeve 5 that surrounds the input shaft and a reaction piston 8 that may be axially moved relative to the input shaft 2, but is arranged such that it is unable to rotate and is connected to the valve sleeve 5 via an elastic rotary driver, a torsion-proof, axially elastic element 13 is arranged in the steering valve 1, with one end of said element being fastened on the input shaft 2 and its other end being fastened on the reaction piston 8.

11 Claims, 3 Drawing Sheets

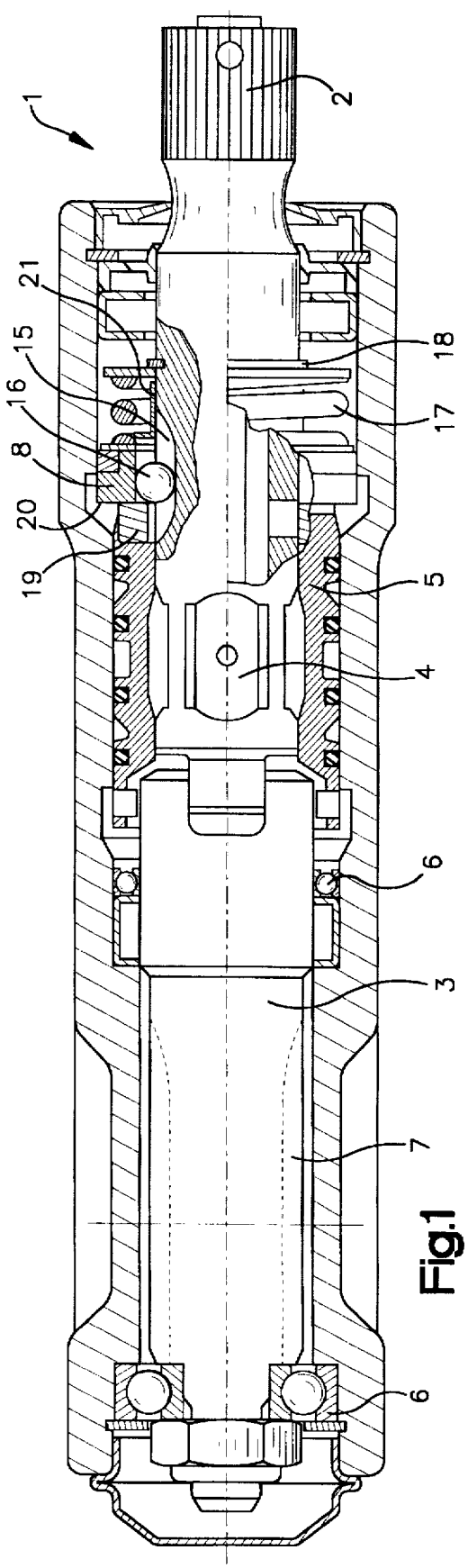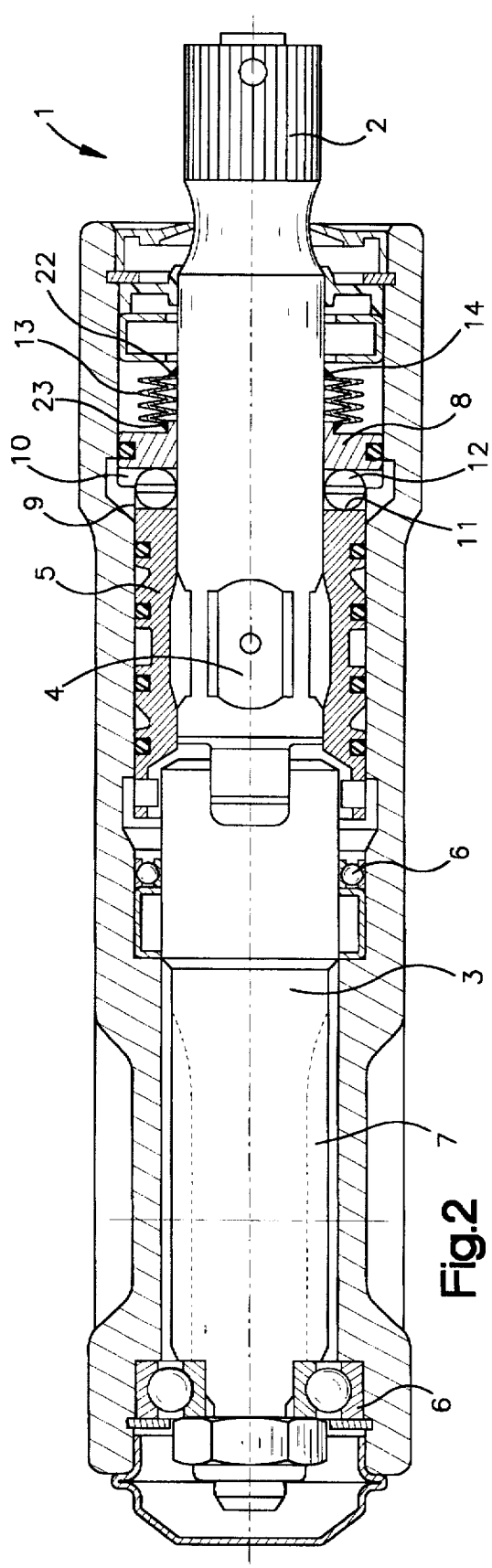
Fig.1 (PRIOR ART)
Fig.2

STEERING VALVE

BACKGROUND OF THE INVENTION

The invention pertains to a steering valve for supplying an actuator with hydraulic pressure, comprising an input shaft, an output shaft, a torsion rod one end of which is connected to the input shaft and the other end of which is connected to the output shaft, a valve sleeve that surrounds the input shaft, and a reaction piston that may be axially moved relative to the input shaft but is arranged so that it is unable to rotate and so that it is connected to the valve sleeve via an elastic rotary driver.

Steering valves of the previously described type are known, for example, from U.S. Pat. No. 4,819,545. In this case, an input shaft that is connected to a steering rod is also connected to an output shaft which is provided with a pinion via a torsion rod. The pinion acts upon the steering rack of a steering system. It is known to utilize steering valves in steering systems of this type. For this purpose, a valve sleeve is provided which engages with the output shaft and surrounds the input shaft. A pump conveys hydraulic fluid under pressure through the system. When turning the input shaft relative to the valve sleeve, hydraulic pressure is supplied to a hydraulic motor that boosts the movement of the steering rack in one of two possible directions. A reaction piston subject to the pressure of a compression spring receives hydraulic pressure in dependence on the speed such that the torque that must be overcome in order to turn the input shaft relative to the valve sleeve is varied in dependence on the speed. Known reaction pistons of this type are fixed such that they are unable to rotate relative to the input shaft by means of balls that are guided in longitudinal grooves arranged on the input shaft. In addition, the reaction piston is pretensioned in the direction of the valve sleeve by means of a compression spring. A so-called expansion piston is arranged on the face side of the valve sleeve which points toward the reaction piston, with said expansion piston and the opposing face side of the reaction piston forming an elastic rotary driver. For this purpose, V-shaped grooves into which balls are inserted are arranged on the opposing face sides of the expansion piston and the reaction piston. If a torque is applied on the input shaft, said torque is transferred on the valve sleeve via the reaction piston and the elastic rotary driver. Due to the balls of the elastic rotary driver that are arranged in the V-shaped grooves, i.e., the ball coupling, the torque is converted into an axial force that acts against the force of the spring which applies pressure to the reaction piston. As soon as this axial force that is generated by the ball coupling exceeds the counteracting spring force, the reaction piston is moved axially away from the valve sleeve and a relative rotational movement between the input shaft and the valve sleeve becomes possible. One variation of the torque can be realized by generating an adjustable hydraulic pressure on the side of the reaction piston that is situated opposite to the spring. Power steering valves of this type are referred to as parameter valves.

One disadvantage of conventional parameter valves can be seen in the insufficient coupling between the input shaft and the reaction piston, particularly because the input shaft must be provided with longitudinal grooves such that said input shaft is mechanically weakened and the manufacturing costs are increased. The groove/ball arrangement that allows an axial movement of the reaction piston relative to the input shaft, but prevents a rotational movement of the reaction piston relative to the input shaft cannot, in practice, be manufactured without play. This play is perceived by the driver as steering wheel play and consequently is considered disadvantageous. In addition, this arrangement is subjected to substantial frictional forces, so that the play also increases over the course of time. During intense movements of the valve, e.g., while driving on inferior roadways, the aforementioned parameter valves have the tendency to produce unpleasant and disturbing clattering noises due to this groove/ball arrangement. In addition, it is necessary to hydraulically seal the region of the steering valve that is situated on the side of the reaction piston due to the longitudinal grooves arranged in the input shaft. Seals of this type are designated as "upper seals" and represent one source of steering valve failure over the course of time.

Since the helical spring that applies pressure to the reaction piston is supported against the input shaft on a locking ring, the resulting pretension of the reaction piston depends on the quality of the preassembly of the valve. Consequently, there exists an undesired margin of error in the spring pretension to be adjusted. Due to the utilization of a helical spring, the spring force acting upon the reaction piston is not concentric. This can lead to twisting of the valve which manifests itself in the form of friction on the input shaft and can even lead to hysteresis problems.

In the final stage of the assembly of a conventional parameter valve, the valve is balanced, i.e., the components are ultimately positioned relative to one another, by fixing the expansion piston, e.g., by means of pressing, relative to the end of the valve sleeve in the last production step. Even the slightest errors during this process can lead to imbalances that can ultimately cause a malfunction of the steering valve.

One particular problem in conventional parameter valves can be seen in the fact that the grooves for the balls which are machined into the expansion piston and the reaction piston are usually produced in pairs, e.g., by means of cutting, for reasons of an economic manufacturing process. Due to the arrangement of these grooves in pairs, ball couplings with, for example, four balls are used such that an unfavorable load distribution results.

All conventional parameter valves are associated with high manufacturing costs and expenditure of structural components.

SUMMARY OF THE INVENTION

The invention is based on the objective of improving a steering valve of this type so that the aforementioned disadvantages are eliminated and so that the steering valve can be manufactured and assembled in a more economical fashion, requiring practically no maintenance and being insusceptible to defects.

In order to attain this objective, the conventional steering valve is improved by arranging a torsion-proof element that is elastic in the axial direction in the steering valve, with one end of said element being fastened on the input shaft and its other end being fastened on the reaction piston.

Due to the utilization of a torsion-proof, axially elastic element, it is no longer necessary to arrange the reaction piston in an axially movable but nonrotating state relative to the input shaft by means of a groove/ball arrangement. This measure eliminates the disadvantages associated with the play, the friction, the clattering noises and the like. Since the entire groove/ball arrangement is eliminated, the machining of the grooves in the input shaft and the associated material weakening as well as the entire group of balls is eliminated such that the valve according to the invention is much more economical. Any play and friction of the coupling element is eliminated since the torsion-proof, axially elastic element is directly fastened on the input shaft and the reaction piston. This direct fastening also makes it possible to exactly define the spring force by axially displacing the elastic element during final assembly. In addition, it is also possible to carry out an exact balancing during this process without having to mutually press together the components that may be moved radially to one another.

The elastic element preferably is a leaf-shaped or disk-shaped spring element. Alternatively, it is also possible to utilize a torsion-proof helical spring. According to the invention, the utilization of a metal expansion bellows as the elastic element is particularly advantageous. Such a metal expansion bellows is an inexpensive component that can be easily fastened to the reaction piston and the input shaft, is absolutely torsion-proof and consequently does not have any play, and in addition, eliminates the requirement for an upper seal.

According to one advantageous proposal of the invention, the elastic element is welded onto the input shaft and/or the reaction piston. According to one advantageous characteristic of the invention, a bearing ring can be arranged between the elastic element and the input shaft.

The ball coupling between the reaction piston and the valve sleeve advantageously comprises sintered coupling rings. The manufacture of coupling rings as sintered components makes it possible to manufacture the coupling rings with three respective depressions for accommodating the balls such that an improved axial load distribution is attained. Since the three balls are always engaged, the tendency of these balls to clatter is reduced. In addition, the sintering process makes it possible to provide larger depressions for accommodating the balls, so that it is possible to utilize larger balls or even a ball cage.

Due to the substantial reduction of the processing measures and the substantial reduction in the expenditure of components, the steering valve of the invention can be manufactured much more economically than conventional parameter valves. In addition, the steering valve of the invention is easier to assemble and balance, with the possibility of exact adjustment. All functional disadvantages are eliminated by simple means. It is not necessary to excessively alter conventional production lines since the conditions regarding the space requirements for the valve are practically unchanged.

BRIEF DESCRIPTION OF THE DRAWINGS

Additional advantages and characteristics are disclosed in the following description of the figures. The figures show:

FIG. 1: a schematic representation of a steering valve known from the state of the art in partial cross section, FIG. 2: a schematic representation of the one embodiment of a steering valve according to the invention in partial cross section.

DESCRIPTION OF THE PREFERRED EMBODIMENTS

Figure 3:
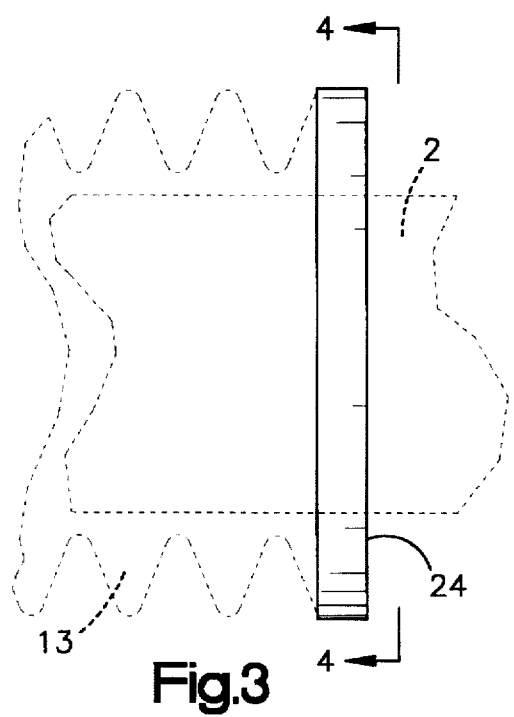
FIG. 3: a schematic representation of a part which may be substituted into the steering valve illustrated in FIG. 2, FIG. 4: a view of the part shown in FIG. 3 taken along line 4—4.

The steering valve that is shown in FIG. 1 and known from the state of the art is only described for reasons of explanation. Identical components are identified by the same reference numerals in both figures.

The steering valve 1 known from the state of the art comprises an input shaft 2, an output shaft 3, as well as a torsion rod 4, both ends of which are connected to one respective end of both shafts. A valve sleeve 5 surrounds the input shaft 2. This group of components is arranged in a housing by means of bearings 6. The output shaft 3 comprises a pinion 7 that is connected to the steering rod of a steering system not shown. A reaction piston 8 that may be axially moved relative to the input shaft 2, but is arranged such that it is unable to rotate is arranged above the valve sleeve 5. The input shaft 2 is provided with longitudinal grooves 15 that accommodate balls 16. The other side of these balls is accommodated in corresponding recesses on the inner surface of the ring of the reaction piston. The reaction piston 8 cannot be turned relative to the input shaft 2, but the reaction piston can be displaced in the axial direction inside the longitudinal groove 15 within the range of the mobility of the balls. The reaction piston 8 is pretensioned against the valve sleeve 5 by means of a helical spring 17, with the helical spring 17 axially fixed to the input shaft by means of a locking ring 18 at the end which is situated opposite to the reaction piston 8. An elastic rotary driver in the form of a ball coupling is arranged between the reaction piston 8 and the valve sleeve 5. For this purpose, an expansion piston 19, which is arranged on the valve sleeve 5, is provided which contains depressions for accommodating the balls on its face side 20 that points toward the reaction piston. These depressions cooperate with additional depressions for accommodating the balls which are arranged in the opposing face side of the reaction piston 8. Since there is hydraulic pressure in the space situated above the reaction piston 8, it is necessary to seal this pressure chamber by means of a so-called upper seal 21. If a torque is applied to the input shaft 2, said torque is transferred on the valve sleeve 5 via the reaction piston 8 to which pressure is applied by the force of the spring and the hydraulic pressure, as well as the ball coupling. A force that moves the reaction piston 8 against the force of the spring 17 and the hydraulic pressure is simultaneously exerted by the ball coupling, with said force becoming larger than the two aforementioned forces beginning with a predetermined torque such that a relative rotation between the input shaft 2 and the valve sleeve 5 is made possible by the separated ball coupling.

The disadvantageous play is caused by the balls 16 that move in the longitudinal grooves 15 as well as the balls used in the ball coupling between the reaction piston 8 and the expansion piston 19. The input shaft is mechanically weakened by the longitudinal grooves 15 as well as the recess for accommodating the locking ring 18.

Figure 5:
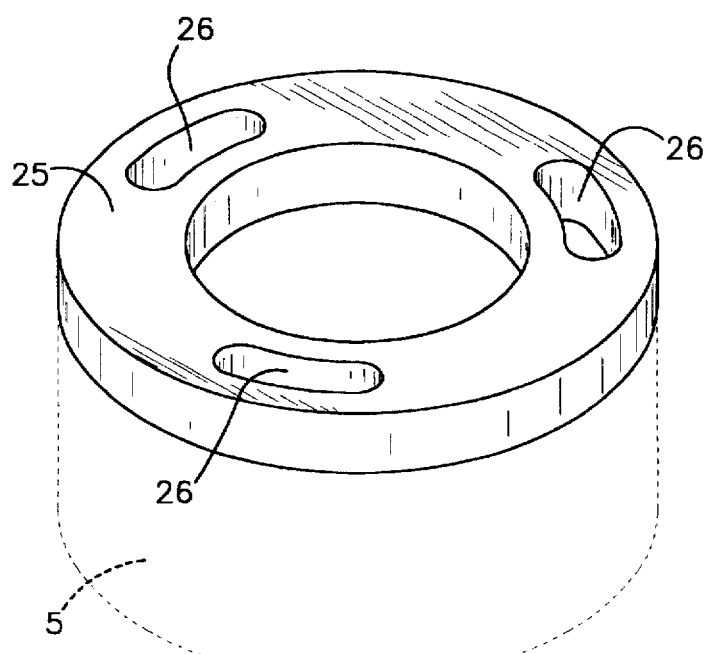
FIG. 5: a schematic perspective view of a part which may be substituted into the steering valve shown in FIG. 2, and FIG. 6: a schematic representation of another embodiment of a steering valve according to the invention, partially in cross-section.

The basic design of the embodiment of the steering valve according to the invention which is shown in FIG. 2 corresponds to the previously described design. The steering valve 1 comprises an input shaft 2, an output shaft 3, both of which are connected to one another via the torsion rod 4, and the valve sleeve 5 that surrounds the input shaft 2. These components are arranged in a housing by means of bearings 6. The pinion 7 of the output shaft 3 serves for driving a steering rack (not shown) that is part of the steering system. The reaction piston 8 t o which pressure is applied by the force of the spring and the hydraulic pressure cooperates with the valve sleeve 5 via a ball coupling 9. Depressions for accommodating the balls 12 are arranged on the face side 10 of the reaction piston and the face side 11 of the valve sleeve. The function of the ball coupling 9 corresponds to the one described previously. The reaction piston 8 to which pressure is applied by the force of the spring and/or the hydraulic pressure is pressed in the direction of the valve sleeve, so that the balls are firmly fixed in the depressions. When applying a torque to the reaction piston, the balls move inside the essentially V-shaped depressions and press the reaction piston away from the valve sleeve against the forces acting upon said reaction piston until the input shaft is correspondingly turned relative to the valve sleeve. In the embodiment shown in FIG. 2, the portion of the ball coupling 9 on the side of the valve sleeve is constructed in one piece with the face side of the valve sleeve 5. As an alternative to the one-piece construction, a separate ball coupling ring 25 (FIG. 5), is fixed to the valve sleeve 6 (shown in phantom). Preferably, the reaction piston 8 and the ball coupling ring 25 are sintered rings, each with three depressions 26. The depressions 26 are spaced from each other at equal annular distances.

Figure 4:
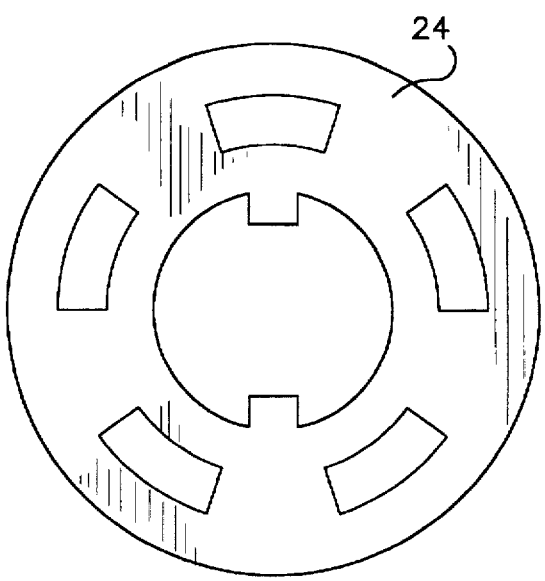
Figure 6:
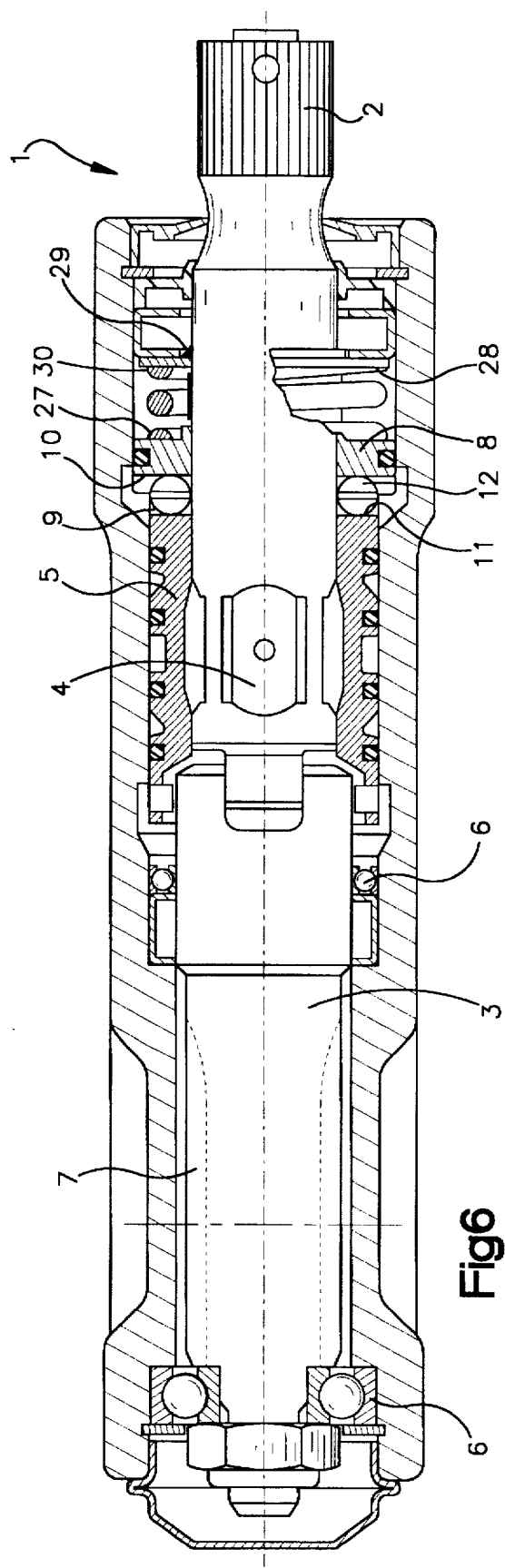

A torsion-proof, axially elastic element in the form of a metal expansion bellows 13 is fastened on the input shaft 2 at the fastening point 14. The other end of the metal expansion bellows 13 is fastened on the reaction piston 8. Preferably the metal expansion bellows 13 is fastened to the input shaft 2 and the reaction piston 8 by welds 22 and 23. Consequently, an upper seal is no longer required. In addition, the input shaft 2 is not weakened by the longitudinal grooves or the recess for the locking ring. The arrangement shown has no play at all and, in particular, is adjustable. As an alternative to the weld 22, the metal expansion bellows 13 is fastened to the input shaft 2 by a bearing ring 24 (FIGS. 3 and 4, the input shaft 2 and the bellows 13 are shown in phantom in FIG. 3). After assembling the individual components, the spring force that acts upon the reaction piston 8 and is generated by the metal expansion bellows 13 can be exactly defined by pretensioning the metal expansion bellows. Subsequently, the metal expansion bellows 13 is fastened to the input shaft 2 at the fastening point 14. A number of processing and assembly procedures as well as a number of components are eliminated. Another embodiment of the invention is shown in FIG. 6 and includes a torsion-proof helical spring 17. The torsion-proof helical spring 17 is fastened to the reaction piston 8 and the input shaft 2 by suitable means. For example, the torsion-proof helical spring 17 is fastened to the reaction piston 8 by welding 27 and is fastened to the input shaft 2 by a ring 28 which is welded 29 to the input shaft 2 and welded 30 to the torsion-proof helical spring 17.

LIST OF REFERENCE NUMERALS

1 Steering valve
2 Input shaft
3 Output shaft
4 Torsion rod
5 Valve sleeve
6 Bearing
7 Pinion
8 Reaction piston
9 Ball coupling
10 Face side
11 Face side
12 Ball
13 Metal expansion bellows
14 Fastening point
15 Longitudinal groove
16 Ball
17 Helical spring
18 Locking ring
19 Expansion piston
20 Face side
21 Upper seal

I claim:

1. A steering valve for supplying an actuator with hydraulic pressure, said steering valve comprising:
   an input shaft;
   an output shaft;
   a torsion rod connected between said input shaft and said output shaft;
   a valve sleeve surrounding said input shaft;
   a reaction piston axially movable relative to said input shaft, said reaction piston partially defining a chamber for receiving a fluid pressure for biasing said reaction piston;
   rotary driver means interconnecting said reaction piston and said valve sleeve for transmitting rotational force between said reaction piston and said valve sleeve; and
   a torsion-proof, axially elastic element having one end fastened to said input shaft and its other end fastened to said reaction piston for holding said reaction piston against rotation relative to said input shaft;
   said rotary driver means including a face side of said valve sleeve and at least one ball engaging said face side of said valve sleeve.

2. A steering valve for supplying an actuator with hydraulic pressure, said steering valve comprising:
   an input shaft;
   an output shaft;
   a torsion rod connected between said input shaft and said output shaft;
   a valve sleeve surrounding said input shaft;
   a reaction piston axially movable relative to said input shaft, said reaction piston partially defining a chamber for receiving a fluid pressure for biasing said reaction piston;
   rotary driver means interconnecting said reaction piston and said valve sleeve for transmitting rotational force between said reaction piston and said valve sleeve; and
   a torsion-proof, axially elastic element having one end fastened to said input shaft and its other end fastened to said reaction piston for holding said reaction piston against rotation relative to said input shaft.

3. A steering valve as set forth in claim 2, wherein said elastic element is a bellows.

4. A steering valve as set forth in claim 2, wherein said elastic element is a torsion-proof helical spring.

5. A steering valve as set forth in claim 2, wherein said elastic element is welded onto said input shaft.

6. A steering valve as set forth in claim 2, wherein said elastic element is welded onto said reaction piston.

7. A steering valve as set forth in claim 2, wherein said rotary driver means includes balls engaging said valve sleeve and said reaction piston.

8. A steering valve as set forth in claim 2, wherein said rotary driver means includes a ring fixed to said valve sleeve.

9. A steering valve as set forth in claim 8, wherein said ring is sintered.

10. A steering valve as set forth in claim 8, wherein said ring and said reaction piston each have a plurality of depressions, said rotary driver means includes a plurality of balls located in said depressions.

11. A steering valve as set forth in claim 10, wherein said depressions in said ring being equally spaced from each other.

* * * * *